United States Patent
Hehemann et al.

(10) Patent No.: US 10,084,617 B2
(45) Date of Patent: Sep. 25, 2018

(54) USER STATION FOR A BUS SYSTEM AND METHOD FOR IMPROVING THE TRANSMISSION QUALITY IN A BUS SYSTEM

(71) Applicant: Robert Bosch GmbH, Stuttgart (DE)

(72) Inventors: Ingo Hehemann, Hagen A.T.W. (DE); Florian Hartwich, Reutlingen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/122,773

(22) PCT Filed: Feb. 27, 2015

(86) PCT No.: PCT/EP2015/054124
§ 371 (c)(1),
(2) Date: Aug. 31, 2016

(87) PCT Pub. No.: WO2015/132145
PCT Pub. Date: Sep. 11, 2015

(65) Prior Publication Data
US 2017/0070366 A1 Mar. 9, 2017

(30) Foreign Application Priority Data
Mar. 5, 2014 (DE) .................. 10 2014 204 050

(51) Int. Cl.
*H04L 12/58* (2006.01)
*H04L 25/02* (2006.01)
*H04L 12/40* (2006.01)

(52) U.S. Cl.
CPC ........ *H04L 25/028* (2013.01); *H04L 12/4013* (2013.01); *H04L 12/40169* (2013.01);
(Continued)

(58) Field of Classification Search
None
See application file for complete search history.

(56) References Cited

U.S. PATENT DOCUMENTS

2014/0071995 A1* 3/2014 Hartwich .............. H04L 1/0002
370/468
2014/0157035 A1* 6/2014 Vowe ........................ G06F 1/12
713/401

FOREIGN PATENT DOCUMENTS

DE          10 000 305 A1   7/2001
DE    10 2012 200 997 A1   2/2013
(Continued)

OTHER PUBLICATIONS

International Search Report for PCT/EP2015/054124, dated Jun. 17, 2015.
(Continued)

*Primary Examiner* — Zewdu A Beyen
(74) *Attorney, Agent, or Firm* — Norton Rose Fulbright US LLP; Gerard Messina (57) ABSTRACT

A user station for a bus system and a method for improving the transmission quality in a bus system are provided. The user station includes a transceiver for transmitting or receiving a message to/from at least one additional user station of the bus system via the bus system. In the bus system, exclusive, collision-free access to a bus of the bus system by a user station is at least temporarily ensured. The transceiver includes a transmission signal processing device for transmission signal processing of a transmission signal to be transmitted by the transceiver. The transmission signal processing device is configured for setting a predetermined bit symmetry of bits of the transmission signal by generating an internal transmission signal for the message. In the internal
(Continued)

transmission signal, the dominant phase of the bits is shortened and the recessive phase of the bits is lengthened.

13 Claims, 7 Drawing Sheets (52) U.S. Cl.
CPC .................. *H04L 25/0286* (2013.01); *G05B 2219/25032* (2013.01); *H04L 2012/40215* (2013.01); *H04L 2012/40267* (2013.01)

(56) References Cited

FOREIGN PATENT DOCUMENTS

EP          0858195 A2    8/1998
WO     2006/043229 A1    4/2006

OTHER PUBLICATIONS

"CAN with Flexible Data-Rate, Specification Version 1.0" (source: http://www.semiconductors.bosch.de), 2016.

* cited by examiner

USER STATION FOR A BUS SYSTEM AND METHOD FOR IMPROVING THE TRANSMISSION QUALITY IN A BUS SYSTEM

FIELD OF THE INVENTION

The present invention relates to a user station for a bus system and a method for improving the transmission quality in a bus system, in which a possible asymmetry between transmitted bits is reduced.

BACKGROUND INFORMATION

The CAN bus system has become widespread for communication between sensors and control units. In the CAN bus system, messages are transmitted with the aid of the CAN protocol, as described in the CAN specification in ISO 11898.

Patent document DE 10 000 305 A1 discusses the controller area network (CAN) and an enhancement of the CAN, referred to as time-triggered CAN (TTCAN). The method for controlling media access used in the CAN is based on bit-wise arbitration. In the CAN, the bit-wise arbitration is carried out based on a leading identifier within the message that is to be transmitted via the bus.

As already discussed in DE 10 2012 200 997, during bit-wise arbitration multiple user stations may simultaneously transmit data to the bus system without interfering with the data transmission.

In the CAN protocol, the bit rate in the arbitration field and the data field is the same, so that bit rate_arb=bit rate_data. The maximum bit rate is 1 megabits per second (Mbps); i.e., the bit time is 1 µs.

The CAN protocol has been developed further under the name CAN FD, according to which messages are transmitted corresponding to the specification "CAN with Flexible Data-Rate, Specification Version 1.0" (source: http://www.semiconductors.bosch.de). With CAN FD, it is possible to increase the data rate for systems in which the data rate was previously limited by the bus length of the systems.

For CAN FD, in comparison to the classical CAN, the bit rate for the subsequent data phase is increased to 2 Mbps, 4 Mbps, 8 Mbps, for example, at the end of the arbitration phase, so that bit rate_arb<bit_rate data. For the physical layer of a transceiver of a user station of a CAN FD bus system, the bit symmetry is an important parameter for error-free transmission.

During the transmission of the signals on the bus system, switching is carried out between a high signal status and a low signal status or vice versa, depending on the data to be transmitted; with regard to a transmission signal TX and a reception signal RX, the low signal status is also referred to as the dominant state, and the high signal status is also referred to as the recessive state. A signal transmitted to the bus, the bus signal, is hereby delayed with respect to transmission signal TX of a user station of the bus system. In addition, in another user station of the bus system, reception signal RX is delayed with respect to the bus signal, which results due to transmission signal TX.

Bit symmetry Bitsym may be defined as Bitsym=t_tx−t_rx, where t_tx is the bit duration at the TX input of the transceiver of the transmitting user station, and t_rx is the bit duration at the RX output of the transceiver of the same user station. The ideal bit symmetry is 0, so that t_rx=t_tx. This applies for both states, i.e., the recessive state and the dominant state.

When the bit symmetry is too low (the dominant phase is too long), communication is no longer possible, since the recessive bits ascertained at the terminal for reception signal RX are so short that the CAN protocol controller is no longer able to set a sample point. The same is true if the recessive phase is too long, as the result of which the dominant phase is too short.

The bit symmetry is independent of the bit rate. However, poor bit symmetry has a greater effect at a higher bit rate. At 500 kilobits per second (kbps), the state changes, also referred to as switching times, have much less influence on the overall bit time than at 8 Mbps, for example. At high bit rates, it is also relevant that the switching time or edge from dominant to recessive (dom=>rec) is longer than the switching time or edge from dominant to recessive (dom=>rec), since the recessive state, which is determined by the ISO standard, cannot be actively driven. A bit asymmetry thus occurs. Dominant bits become longer, and recessive bits become shorter.

The parameter of the bit symmetry has recently been introduced into the CIA CAN FD Interest Group (Spec 601-1), in which time t_rec for a recessive bit at 2 Mbps may be situated in the range of t_rec=400 . . . 550 ns, and at 5 Mbps, may be situated in the range of t_rec=120 . . . 220 ns. In this regard, line resistance RL has a value of 60 ohms, line capacitance CL has a value of 100 pF, and capacitance CRXD, which is the load capacitance present at the RXD terminal or the RXD pin, has a value of 15 pF, for example.

It is thus problematic that a lack of bit symmetry has a greater effect with increasing bit rate. If the bit symmetry required for the signal is not met, faulty transmissions in the bus system occur.

SUMMARY OF THE INVENTION

The object of the present invention, therefore, is to provide a user station for a bus system and a method for improving the transmission quality in a bus system which address the problems mentioned above. In particular, the aim is to provide a user station for a bus system and a method for improving the transmission quality in a bus system in which the requirements for bit symmetry of a signal received in the bus system are met, so that faulty transmissions do not occur.

The object may be achieved by a user station for a bus system according the description herein. The user station includes a transceiver for transmitting or receiving a message to/from at least one additional user station of the bus system via the bus system, whereby the bus system at least temporarily ensures exclusive, collision-free access to a bus of the bus system by a user station, the transceiver including a transmission signal processing device for transmission signal processing of a transmission signal to be transmitted by the transceiver, and the transmission signal processing device being configured for setting a predetermined bit symmetry of bits of the transmission signal by generating an internal transmission signal for the message, in the internal transmission signal the dominant phase of the bits being shortened and the recessive phase of the bits being lengthened.

Better bit symmetry in the CAN_H and CAN_L of the bus system is possible with the user station. Faulty transmissions between user stations of the bus system are thus prevented, and system applications using CAN FD are made possible. The higher bit symmetry provides degrees of freedom for dimensioning the bus topology.

Further advantageous embodiments of the user station are described in the further descriptions herein.

The transmission signal processing device may possibly be configured for delaying the falling edge of a bit in the internal transmission signal, so that the dominant phase of the bits is shortened and the recessive phase of the bits is lengthened.

The transmission signal processing device may also be configured for implementing a time for delaying the falling edge of a bit in the internal transmission signal, regardless of the result of a measurement of the bit symmetry.

It is also possible for the transmission signal processing device to be configured for carrying out transmission signal processing only when the user station itself is the transmitter.

According to one exemplary embodiment, the transmission signal processing device is configured for switching transmission signal processing on or off as a function of the arbitration phase and the data area of the message. The transmission signal processing device may be configured for carrying out transmission signal processing only for the data area.

The transceiver may additionally include transmission stages for bus wires CAN_H and CAN_L of the bus, the transmission signal processing device being configured for modifying the transmission stages for CAN_H and CAN_L, so that the transmission stages for CAN_H and CAN_L actively drive the state change from dominant to recessive in the data area.

Furthermore, the user station may additionally include a communication control device for controlling the communication in the bus system, the communication control device or the transceiver being configured for detecting a data area.

The above-described user station may be part of a bus system which includes a bus, and at least two user stations that are connected to one another via the bus in such a way that they are able to communicate with one another, at least one of the at least two user stations being a user station described above.

Moreover, the above-mentioned object is achieved by a method for improving the transmission quality in a bus system according to Claim 10. In the bus system, exclusive, collision-free access to a bus of the bus system by a user station is at least temporarily ensured. The method includes the following steps: processing a transmission signal to be transmitted by the transceiver, using a transmission signal processing device of a transceiver of the user station, by setting a predetermined bit symmetry of bits of the transmission signal by generating an internal transmission signal, in which the dominant phase of the bits is shortened and the recessive phase of the bits is lengthened, and transmitting, with the transceiver, the internal transmission signal as a message to at least one additional user station of the bus system via the bus system.

The method provides the same advantages as mentioned above with regard to the user station.

Further possible implementations of the present invention include combinations, even if not explicitly mentioned, of features or specific embodiments described above or below with regard to the exemplary embodiments. Those skilled in the art will also add enhancements or supplements to the particular basic form of the present invention.

The present invention is described in greater detail below with reference to the appended drawings, and based on exemplary embodiments.

Unless stated otherwise, similar or functionally equivalent elements are provided with the same reference numerals in the figures.

DETAILED DESCRIPTION

Figure 1:
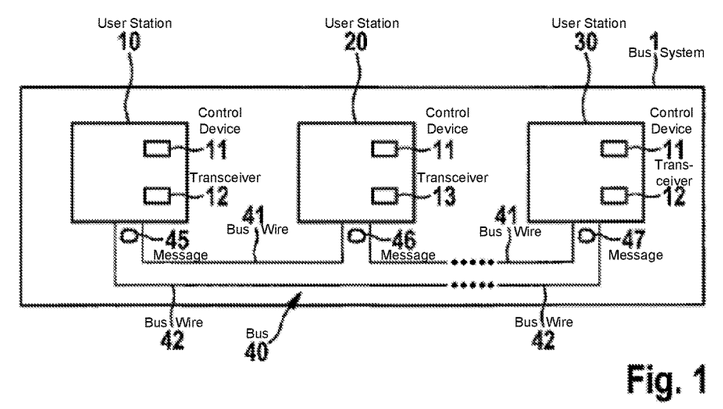
FIG. 1 shows a simplified block diagram of a bus system according to a first exemplary embodiment.

FIG. 1 shows a bus system 1 which may be, for example, a CAN bus system, a CAN FD bus system, etc. Bus system 1 may be used in a vehicle, in particular a motor vehicle, an aircraft, etc., or in a hospital, etc.

In FIG. 1, bus system 1 includes a plurality of user stations 10, 20, 30, each connected to a bus 40 including a first bus wire 41 and a second bus wire 42. Bus wires 41, 42 may also be referred to as CAN_H and CAN_L, and are used for coupling the dominant levels in the transmission state. Messages 45, 46, 47 in the form of signals may be transmitted between individual user stations 10, 20, 30 via bus 40. User stations 10, 20, 30 may be, for example, control units or display devices of a motor vehicle.

As shown in FIG. 1, user stations 10, 30 each include a communication control device 11 and a transceiver 12. In contrast, user station 20 includes a communication control device 11 and a transceiver 13. Transceivers 12 of user stations 10, 30 and transceiver 13 of user station 20 are each directly connected to bus 40, even though this is not illustrated in FIG. 1.

Communication control device 11 is used for controlling a communication of the particular user station 10, 20, 30 via bus 40 with another user station of user stations 10, 20, 30 connected to bus 40. Communication control device 11 may be configured as a conventional CAN controller.

Transceiver 13 of user stations 20 is used for transmitting messages 46 in the form of a transmission signal TX to another user station of bus system 1, and for receiving messages 45, 47 of the other user stations of bus system 1 in the form of a reception signal RX. Transceiver 13 may be configured as a conventional CAN transceiver.

Figure 2:
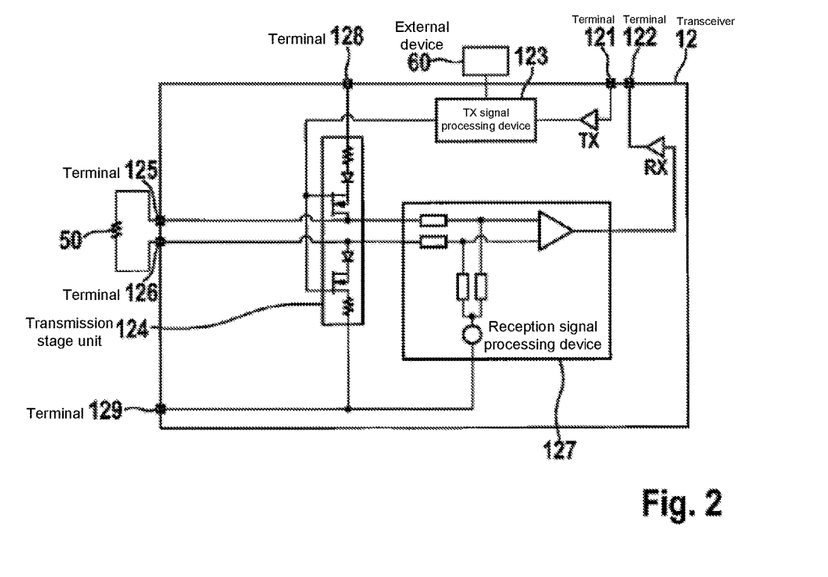
FIG. 2 shows a block diagram of a transceiver of a user station of the bus system according to the first exemplary embodiment.

FIG. 2 shows the design of transceiver 12 in this context.

Transceiver 12 is connected at its terminals 121, 122 to communication control device 11. Terminal 121 is used for inputting transmission signal TX from communication control device 11 into transceiver 12 for transmission to bus 40. Terminal 122 is used for relaying reception signal RX, received from transceiver 12, from bus 40 to communication control device 11. In the path of transmission signal TX, transceiver 12 includes a transmission signal processing device 123 for processing transmission signal TX before transmission signal TX is relayed to a transmission stage unit 124 for the transmission stages of bus wires CAN_H and CAN_L. Bus wire CAN_H is connected to a terminal 125 of transceiver 12. Bus wire CAN_L is connected to a terminal 126 of transceiver 12. Reception signal RX is conveyed from terminals 125, 126 to a reception signal processing device 127 before the reception signal is relayed to communication control device 11 via terminal 122. At a terminal 128 of transceiver 12, transmission stage unit 124 is connected to a voltage VCC5 for transmission stage unit 124. Transmission stage unit 124 and reception signal processing device 127 are connected to ground via a terminal 129, and are thus grounded. The transmission characteristics at terminals 125, 126 may be measured with the aid of a resistor 50 of a decoupling network. Resistor 50 typically has a value of 60 ohms. Transmission signal processing device 123 is configurable by an external device 60.

In contrast, transceiver 13 does not include a transmission signal processing device 123, and is therefore configured as a conventional CAN transceiver, for example.

Transceiver 12 thus communicates according to the CAN protocol, whereas transceiver 13 may communicate according to the CAN protocol or the CAN FD protocol.

Figure 3:
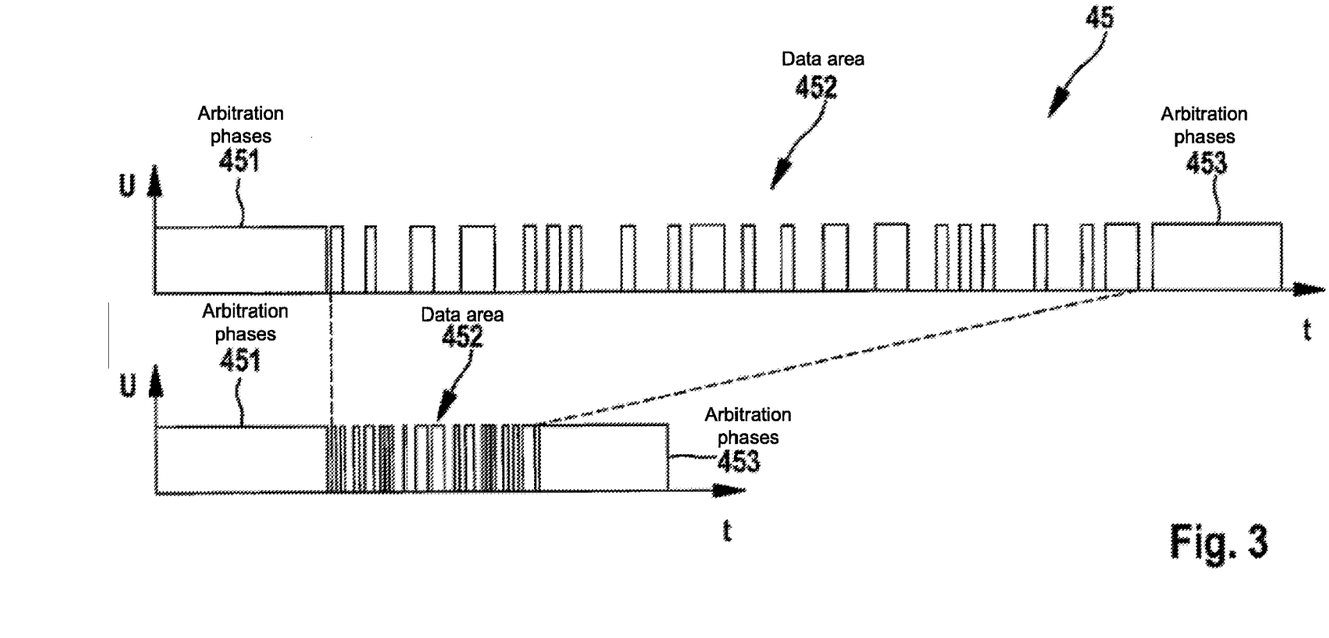
FIG. 3 shows a diagram for illustrating the structure of a message that is transmitted from a user station of the bus system according to the first exemplary embodiment.

The upper part of FIG. 3 shows, with reference to message 45, a CAN frame which is transmitted by transceiver 12 or transceiver 13, and the lower part of FIG. 3 shows a CAN FD frame, which may be transmitted by transceiver 12. For the CAN communication on bus 40, the CAN frame and the CAN FD frame are basically divided into two different phases, namely, arbitration phases 451, 453, and a data area 452, which for CAN HS is also referred to as the data field, and which for CAN FD is also referred to as the data phase. For CAN FD, in comparison to the classical CAN, the bit rate for the subsequent data phase is increased to 2, 4, 8 Mbps, for example, at the end of the arbitration phase 451. Consequently, for CAN FD the bit rate in arbitration phases 451, 453 is less than the bit rate in data area 452. For CAN FD, data area 452 is significantly shorter than data area 452 of the CAN frame.

During the communication in bus system 1, on the one hand a bit asymmetry may occur due to the fact that the position of the reception threshold according to ISO 11898-2 is typically 0.7 V, and therefore is not centrally situated in the typical bus differential voltage of 2 V. On the other hand, a bit asymmetry results from the fact that the CAN protocol requires dominant and recessive states, whereby the state change from recessive to dominant (rec=>dom) is actively driven by transmission stages CAN_H and CAN_L, whereas the state change from dominant to recessive (dom=>rec) is determined for the most part by the configuration of the bus, such as resistors and capacitors.

Figure 4:
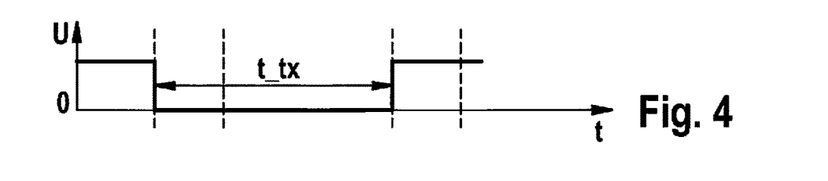
FIG. 4 shows a voltage curve of a transmission signal as a function of time, the way it may be transmitted by a user station of the bus system according to the first exemplary embodiment.
Figure 5:
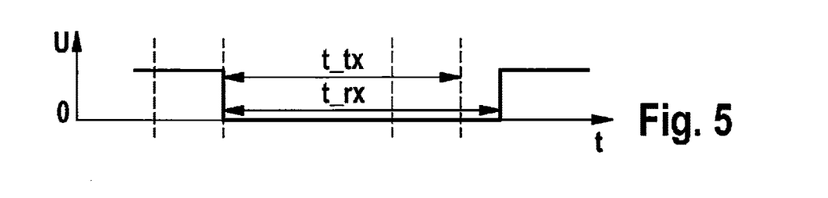
FIG. 5 shows a voltage curve of a reception signal as a function of time, the way it is received by a user station of the bus system for transmission, according to the first exemplary embodiment.

FIGS. 4 and 5 show the result of transmitting a message 45 as a CAN frame or a CAN FD frame via transceiver 12, for the case in which no correction of transmission signal TX is carried out in transceiver 12. Transmission signal TX is illustrated in FIG. 4 as a timing diagram for voltage U as a function of time t. In terms of time, transmission signal TX initially has a recessive phase, then a dominant phase, and then a recessive phase once again. The dominant phase and/or the recessive phase may include one or multiple bit(s). FIG. 5 shows resulting reception signal RX as a timing diagram for voltage U as a function of time t. A time $t\_tx$ at which transmission signal TX has the dominant level is hereby lengthened to a time $t\_rx$ in reception signal RX.

Figure 6:
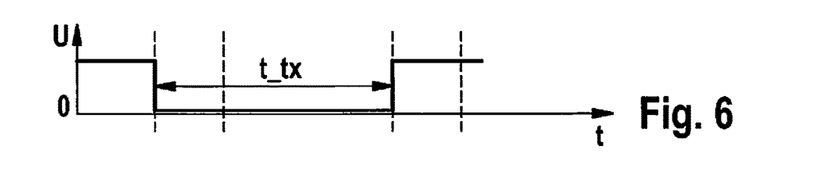
FIG. 6 shows a voltage curve of a transmission signal as a function of time, the way it is received by a transceiver for transmission, according to the first exemplary embodiment.
Figure 7:
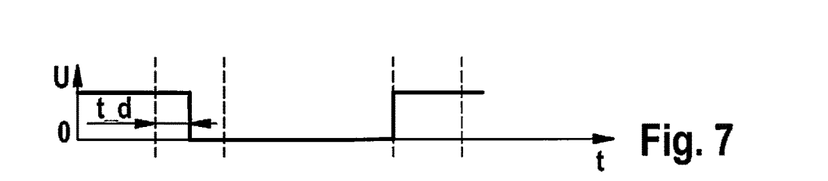
FIG. 7 shows a voltage curve of an internal transmission signal as a function of time, the way it is generated by a transceiver according to the first exemplary embodiment.
Figure 8:
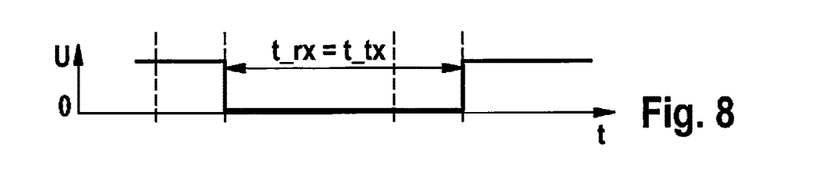
FIG. 8 shows a voltage curve of a reception signal as a function of time, the way it is received by a user station of the bus system according to the first exemplary embodiment.

In contrast, FIGS. 6 through 8 show the result of transmitting a message 45 as a CAN frame or a CAN FD frame via transceiver 12, for the case in which a correction of transmission signal TX is carried out in transceiver 12, as described below. FIG. 6 shows transmission signal TX as a timing diagram for voltage U as a function of time t. In terms of time, transmission signal TX initially has a recessive phase, then a dominant phase, and then a recessive phase once again. The dominant phase and/or the recessive phase may include one or multiple bit(s). FIG. 7 shows transmission signal TX_intern, generated internally in transceiver 12, as a timing diagram for voltage U as a function of time t. FIG. 8 shows resulting reception signal RX as a timing diagram for voltage U as a function of time t. Transmission signal TX_intern generated internally in transceiver 13 is delayed by a delay time $t\_d$ with respect to the falling edge of transmission signal TX with the aid of transmission signal processing device 123. Time $t\_rx$ at which reception signal RX has the dominant level due to transmission signal TX is thus shortened in reception signal RX, so that $t\_rx=t\_tx$.

In other words, the signal arriving at the TX terminal (TX pin) of transceiver 12 is delayed by time $t\_d$ with respect to the falling edge by transmission signal processing device 123. The dominant phase of bits of the signal arriving at the TX terminal of transceiver 12 is thus shortened. Similarly, the recessive phase of bits of the signal arriving at the TX terminal of transceiver 12 is lengthened.

The ideal bit symmetry for reception signal RX may be set with this method carried out by transmission signal processing device 123.

Figure 9:
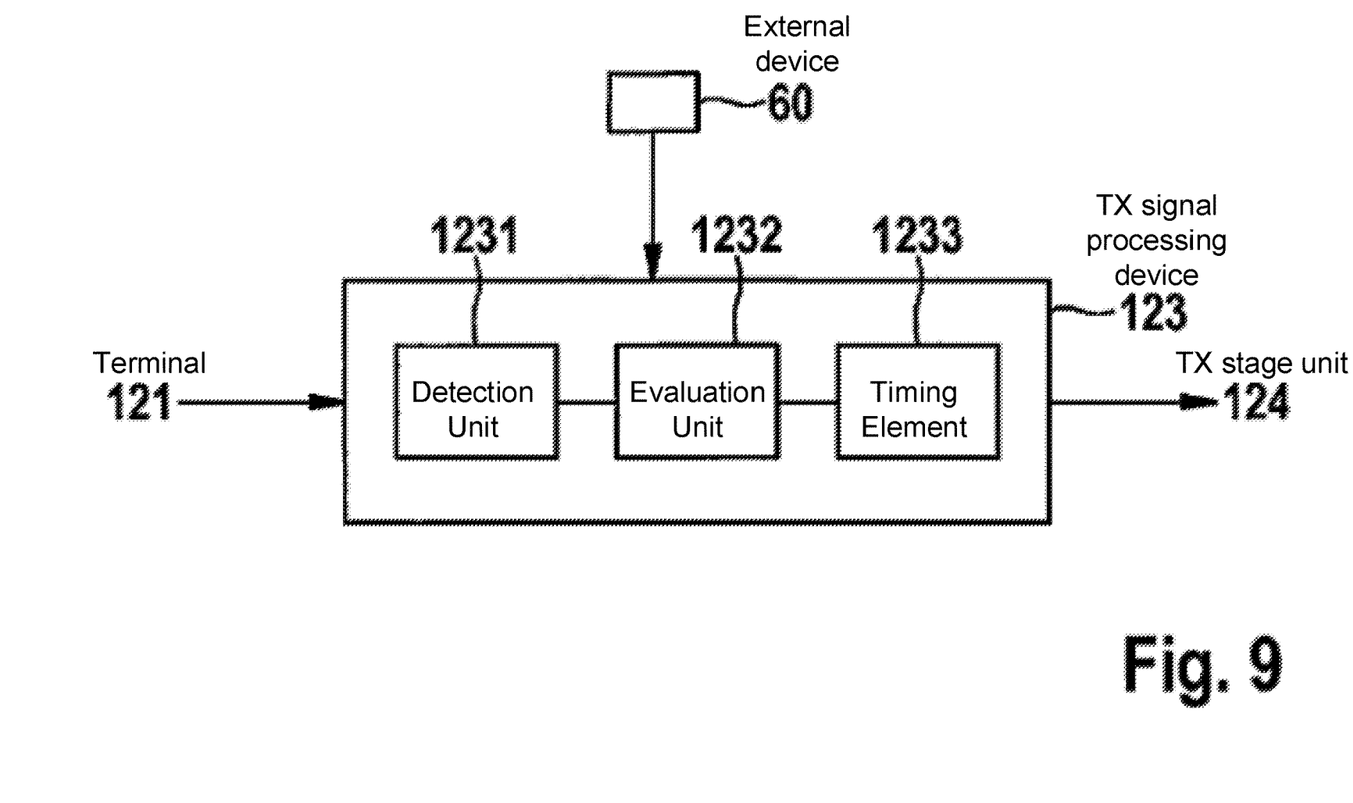
FIG. 9 shows a block diagram of a transmission signal processing device according to the first exemplary embodiment.

FIG. 9 shows one possible design of transmission signal processing device 123. Accordingly, transmission signal processing device 123 may include a detection unit 1231, an evaluation unit 1232, and a timing element 1233. Transmission signal processing device 123 may carry out a method for improving the reception quality in bus system 1, as depicted in FIG. 10.

Figure 10:
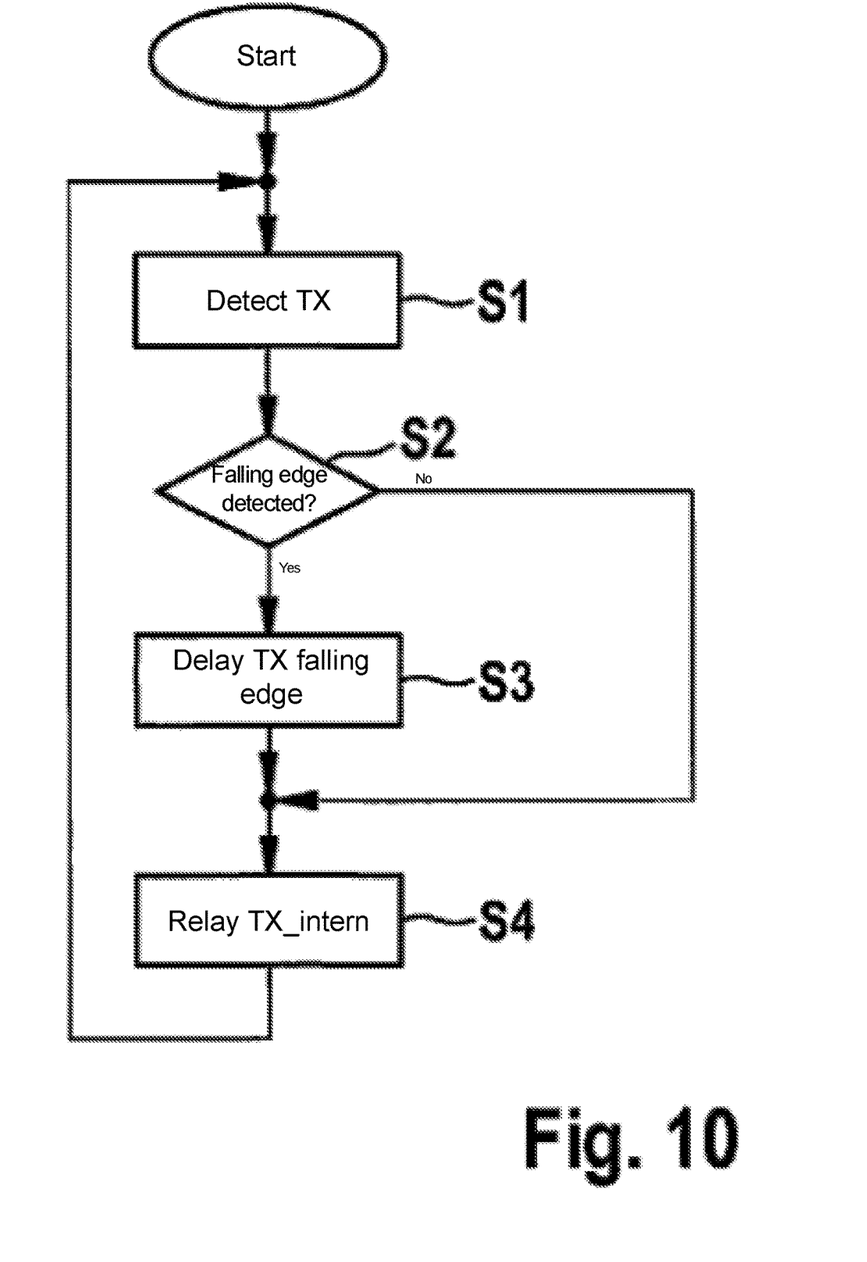
FIG. 10 shows a flow chart of a method for improving the reception quality in the bus system according to the first exemplary embodiment.

According to FIG. 10, after the start of the method in a step S1, transmission signal TX is detected with detection unit 1231, and the result of the detection is conveyed to evaluation unit 1232. The method then proceeds to a step S2.

In step S2, evaluation unit 1232 evaluates whether or not detection unit 1231 has detected a falling edge of transmission signal TX. If a falling edge of transmission signal TX has been detected, the method proceeds to a step S3. Otherwise, the method proceeds to a step S4.

Timing element 1233 is used in step S3, and delays the falling edge of transmission signal TX by delay time $t\_d$, as depicted in FIGS. 6 and 7. Delay time $t\_d$ may be set by external device 60. This may be carried out using external device 60 during configuration of transmission signal processing device 123. The method subsequently proceeds to step S4.

Transmission signal TX_intern is relayed to transmission stage unit 124 of transceiver 12, and is thus coupled to bus 40, in step S4. The method subsequently returns to step S1.

The method is terminated when transmission signal processing device 123 and/or transceiver 12 and/or user station 10, 30 is/are switched off.

Transceiver 12 is thus capable of balancing a bit asymmetry in reception signal RX and establishing the ideal bit symmetry.

By use of transmission signal processing device 123, it should be ensured that the upper limit of the propagation delay time from the ISO 11898-2 standard is not exceeded. For example, for transceiver 13, the maximum propagation delay time, as a function of temperature and multiple parts, may have a value of 200 ns. If a delay time t_d having a value of 35 ns is then required for transceiver 12 in order to set the ideal bit symmetry, the propagation delay time of transceiver 12 is 235 ns. This is less than the maximum propagation delay time from ISO 11898-2, which has a value of 255 ns, so that the requirement of ISO 11898-2 is met.

In one advantageous modification of the present exemplary embodiment, delay time t_d is not fixed, and instead is regulated or adjusted based on a measurement of the bit symmetry. The ideal bit symmetry may always be achieved in this way. The measurement may be carried out by transceiver 12 or external device 60.

The method carried out by transceiver 12 in transmission signal processing device 123 allows, for the first time, a CAN FD system design for present topologies. The method carried out by transceiver 12 in transmission signal processing device 123 is applicable for CAN HS and CAN FD. In addition, it is advantageous that the method carried out by transceiver 12 in transmission signal processing device 123 is independent of certain communication phases on bus 40.

Figure 11:
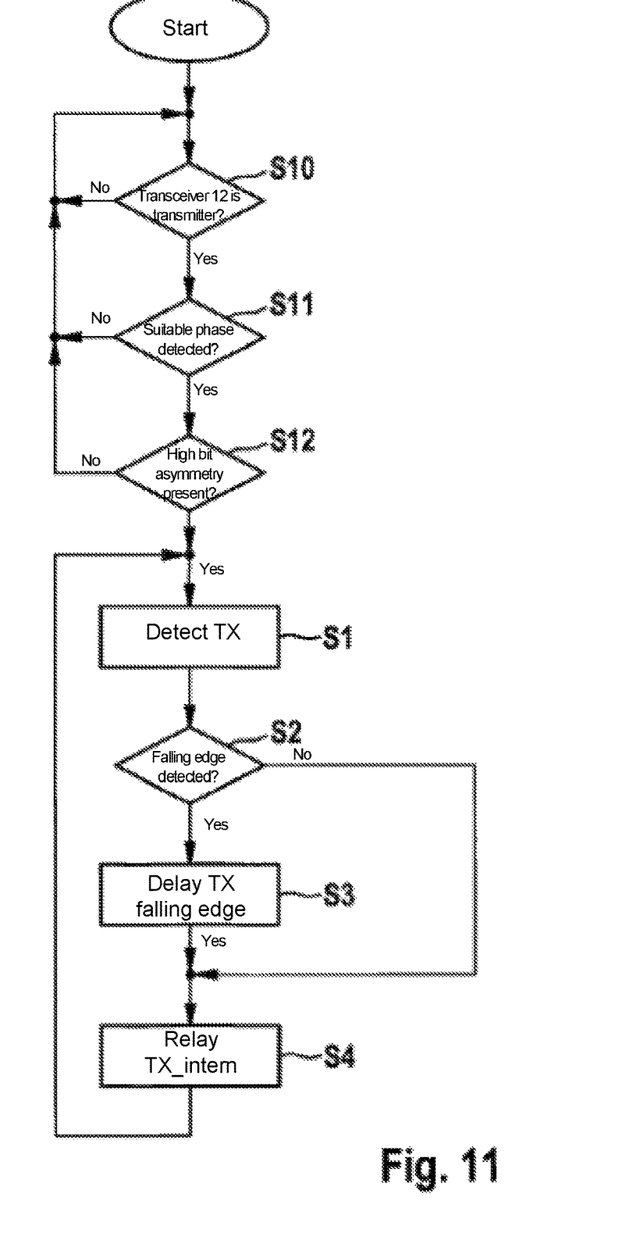
FIG. 11 shows a flow chart of a method for improving the reception quality in the bus system according to a second exemplary embodiment.

FIG. 11 depicts a method according to a second exemplary embodiment. Transmission signal processing device 123 once again carries out the method for improving the reception quality in bus system 1, as described with regard to the first exemplary embodiment. However, according to the present exemplary embodiment, transmission signal processing device 123 additionally carries out steps S10, S11, S12.

In step S10, transmission signal processing device 123, for example likewise with detection unit 1231, detects whether transceiver 12 itself is the transmitter. For this purpose, transmission signal processing device 123 may observe the falling edges of transmission signal TX arriving at transceiver 1200 from communication control device 11. Transmission signal processing device 123, based on the counted falling edges of transmission signal TX, assesses whether transceiver 12 is functioning as a transmitter in data area 452. For this reason, detection unit 1231 includes a counter which is configured in particular as a 5-bit counter. The falling edges of transmission signal TX are used as a clock input of detection unit 1231 or of the counter. Alternatively, the counter may count the rising edges of transmission signal TX. Use is hereby made of the fact that in arbitration phases 451, 453, a maximum of 35 bits (without stuffing bits) are transmitted; i.e., a maximum of 17 falling edges appear. These may be detected, for example, by using a 5-bit counter. The counter is reset via a timing element. The bit rate of arbitration phases 451, 453 is transmitted to detection unit 1231. The timing element is typically 8 bits. However, the timing element may also be at least 6 bits, and a maximum of 11 bits. The selection of the timing element depends on the particular data transmission protocol of the bus system used.

If transceiver 12 itself is the transmitter, the method proceeds to a step S11. Otherwise, the method returns to step S10.

In step S11, transmission signal processing device 123, for example likewise with detection unit 1231, determines whether a phase which is suitable for the transmission signal processing with transmission signal processing device 123 is detected during the CAN communication. Phases or areas for transmission signal processing with transmission signal processing device 123 are always suitable when it is ensured that user station 10, 30 itself transmits, and no other user station of bus system 1 transmits. For CAN and CAN FD, this is the case in data area 452 in FIG. 2. The recognition of the end of arbitration phase 451, 453 or the beginning of data area 452 using detection device 127 may already be deduced from the result of step S10. Alternatively or additionally, the recognition of the end of arbitration phase 451, 453 or the beginning of data area 452 may take place via a BRS bit which is present at the end of arbitration phases 451, 453. Transceiver 12 is capable of decoding the data transmission protocol used in data area 452. Thus, transceiver 12 is a partial networking transceiver. When transmission signal processing device 123 has detected data area 452, the method proceeds to a step S12. Otherwise, the method returns to step S10.

In step S12, transmission signal processing device 123, for example with the aid of detection unit 1231, measures the bit symmetry of CAN_H and CAN_L. The bit rate in data area 453 is hereby ascertained. If an excessively high bit asymmetry is present, the method proceeds to step S1, so that transmission signal processing is carried out as described in the first exemplary embodiment with reference to FIGS. 9 and 10. Otherwise, the method returns to step S10.

The transmission signal processing with transmission signal processing device 123 begins with recognition of data area 452. The transmission signal processing with transmission signal processing device 123 is terminated at the end of data area 452. The settings used are stored, and are maintained until transmission signal processing device 123 detects next data area 452, or until the end of an arbitration phase 451, 453 is detected and thus recognized. The method carried out by transmission signal processing device 123 with S1 through S4 may thus be switched on or off as a function of arbitration phase 451; 453 and of data area 452 of message 45 or of messages 46; 47.

According to the present exemplary embodiment, transceiver 12 may be implemented in a particularly cost-effective manner when a protocol controller for the partial network function which is integrated into transceiver 12 is present and is usable for recognizing, among other things, the BRS bit at the end of the arbitration. In this regard, the protocol controller should be operated by a sufficiently accurate clock pulse.

According to one modification of the present exemplary embodiment, the recognition of data area 452 takes place with a CAN module of communication control device 11 as an external device 60. The CAN module of communication control device 11 outputs the result of the recognition to transceiver 12 with the aid of a switching signal S. Switching signal S signals data area 452. In this case, transceiver 120 and communication control device 11 each include an additional pin for transmitting switching signal S. This is more cost-effective than the approach according to which a protocol controller which is integrated into transceiver 12 and which recognizes, among other things, the BRS bit at the end of the arbitration and which is to be operated by a sufficiently accurate clock pulse, is necessary.

According to another modification of the present exemplary embodiment, steps S10 through S12 may also be carried out by one or multiple other devices of transceiver 12 or also of external device 60.

The method carried out by transceiver 12 in transmission signal processing device 123 according to FIG. 11 and/or modifications thereof also allow(s), for the first time, a CAN FD system design for present topologies. The method carried out by transceiver 12 in transmission signal processing device 123 according to FIG. 11 and/or modifications thereof are/is also applicable for CAN HS and CAN FD. In addition, it is advantageous that the method carried out by transceiver 12 in transmission signal processing device 123 according to FIG. 11 and/or modifications thereof are/is independent of certain communication phases on bus 40.

Figure 12:
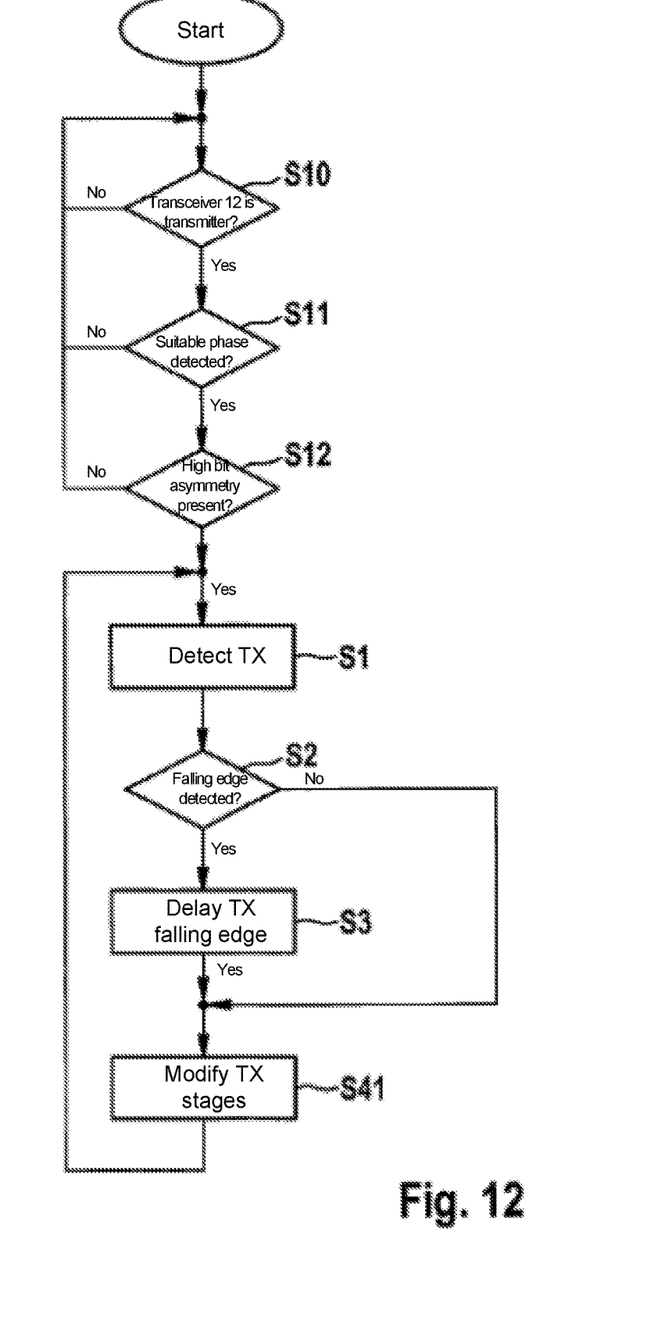
FIG. 12 shows a flow chart of a method for improving the reception quality in the bus system according to a third exemplary embodiment.

FIG. 12 depicts a method according to a third exemplary embodiment. Transmission signal processing device 123 once again carries out the method for improving the reception quality in bus system 1 as described with reference to the second exemplary embodiment. However, a step S41 is carried out here instead of step S4.

In step S41, after recognizing data area 453 for the bits of data area 453, transmission signal processing device 123 modifies the transmission stages for bus wires CAN_H and CAN_L of transmission stage unit 124 in such a way that the state change from dominant to recessive (dom=>rec) is also actively driven by transmission stages CAN_H and CAN_L of transmission stage unit 124. Since this takes place only in data area 453, the situation is avoided that various transceivers 12, 13 of bus system 1 drive against one another.

Also in step S41, due to modified transmission stage unit 124, the dominant phase of bits of the signal arriving at the TX terminal of transceiver 12 is shortened, and the recessive phase of bits of the signal arriving at the TX terminal of transceiver 12 is correspondingly lengthened.

The method carried out by transceiver 12 in transmission signal processing device 123 according to FIG. 12 also allows, for the first time, a CAN FD system design for present topologies. The method carried out by transceiver 12 in transmission signal processing device 123 according to FIG. 12 is also applicable for CAN HS and CAN FD. In addition, it is advantageous that the method carried out by transceiver 12 in transmission signal processing device 123 according to FIG. 12 is independent of certain communication phases on bus 40.

All of the embodiments described above of bus system 1 of user stations 10, 20, 30 and of the method according to the first through third exemplary embodiments may be used alone or in any possible combination. In addition, in particular the following modifications are conceivable.

Bus system 1 described above according to the first through third exemplary embodiments is described with reference to the bus system based on the CAN protocol. However, bus system 1 according to the first through third exemplary embodiments may also be some other type of communication network. It is advantageous, but not a mandatory requirement, for bus system 1 to ensure, at least for certain time periods, an exclusive, collision-free access by a user station 10, 20, 30 to bus 40 or a shared channel of bus 40.

Bus system 1 according to the first through third exemplary embodiments is in particular a CAN network or a CAN FD network or a FlexRay network.

The number and configuration of user stations 10, 20, 30 in bus systems 1 according to the first through third exemplary embodiments is arbitrary. In particular, it is also possible for only user stations 10 or user stations 30 to be present in bus systems 1 in the first through third exemplary embodiments.

To achieve an even higher data rate, within the CAN frame of messages 45, 46, 47 the data transmission may take place analogously to data transmission protocols, such as Ethernet, etc.

The functionality of the exemplary embodiments described above may be implemented in a transceiver 12, a CAN transceiver, a transceiver chipset, a CAN transceiver chipset, or also in a communication control device 11, etc. Additionally or alternatively, they may be integrated into existing products. In particular, it is possible to implement the functionality in question either in the transceiver as a separate electronic module (chip), or embedded in an integrated overall approach in which only one electronic module (chip) is present.

What is claimed is:

1. A user station for a bus system, comprising:
a transceiver for transmitting or receiving a message to or from at least one additional user station of the bus system via the bus system, wherein:
in the bus system, exclusive, collision-free user station access to a bus of the bus system is at least temporarily ensured;
the transceiver includes a transmission signal processing device for transmission signal processing of a transmission signal to be transmitted by the transceiver;
the transmission signal processing device is configured for setting a predetermined bit symmetry of bits of the transmission signal by generating an internal transmission signal for the message;
in the internal transmission signal, the dominant phase of the bits is shortened and the recessive phase of the bits is lengthened; and
the transmission signal processing device is configured to at least one of:
obtain a measurement of an actual bit symmetry, and at least one of (a) determine whether to shorten the dominant phase depending on the measurement and (b) set a variable amount by which the dominant phase is shortened depending on the measurement;
switch the transmission signal processing on or off as a function of an arbitration phase and a data area of the message; and
perform the transmission signal processing based on a detection of the data area of the message.

2. The user station of claim 1, wherein the transmission signal processing device is configured for delaying the falling edge of a bit in the internal transmission signal, so that the dominant phase of the bits is shortened and the recessive phase of the bits is lengthened.

3. The user station of claim 1, wherein the transmission signal processing device is configured for carrying out transmission signal processing only when the user station itself is the transmitter.

4. The user station of claim 1, wherein the transmission signal processing device is configured for switching the transmission signal processing on or off as a function of the arbitration phase and the data area of the message.

5. The user station of claim 4, wherein the transmission signal processing device is configured for carrying out the transmission signal processing only for the data area.

6. The user station of claim 4, wherein the transceiver includes transmission stages for bus wires CAN_H and CAN_L of the bus, and the transmission signal processing device is configured for modifying the transmission stages for CAN_H and CAN_L, so that the transmission stages for CAN_H and CAN_L actively drive the state change from dominant to recessive in the data area.

7. The user station of claim 1, wherein the transmission signal processing device is configured to obtain the measurement of the actual bit symmetry, and at least one of (a) determine whether to shorten the dominant phase depending on the measurement and (b) set the variable amount by which the dominant phase is shortened depending on the measurement.

8. The user station of claim 7, wherein the transmission signal processing device is configured for implementing a time for delaying the falling edge of a bit in the internal transmission signal depending on a result of the measurement of the actual bit symmetry.

9. The user station of claim 1, wherein the transmission signal processing device is configured to perform the transmission signal processing based on the detection of the data area of the message.

10. The user station of claim 9, further comprising:
a communication control device for detecting the data area and controlling communication in the bus system.

11. The user station of claim 9, wherein the transceiver is configured to detecting the data area.

12. A bus system, comprising:
a bus;
at least two user stations that are connected to one another via the bus so that they are able to communicate with one another; and
at least one of the at least two user stations including a transceiver for transmitting or receiving a message to or from at least one additional user station of the at least two user stations via the bus system, wherein:
in the bus system, exclusive, collision-free user station access to the bus of the bus system is at least temporarily ensured;
the transceiver includes a transmission signal processing device for transmission signal processing of a transmission signal to be transmitted by the transceiver;
the transmission signal processing device is configured for setting a predetermined bit symmetry of bits of the transmission signal by generating an internal transmission signal for the message;
in the internal transmission signal, the dominant phase of the bits is shortened and the recessive phase of the bits is lengthened; and
the transmission signal processing device is configured to at least one of:
obtain a measurement of an actual bit symmetry, and at least one of (a) determine whether to shorten the dominant phase depending on the measurement and (b) set a variable amount by which the dominant phase is shortened depending on the measurement;
switch the transmission signal processing on or off as a function of an arbitration phase and a data area of the message; and
perform the transmission signal processing based on a detection of the data area of the message.

13. A method for improving a transmission quality in a bus system, in which exclusive, collision-free access to a bus of the bus system by a user station is at least temporarily ensured, the method comprising:
processing a transmission signal to be transmitted by the transceiver, using a transmission signal processing device of a transceiver of the user station, by setting a predetermined bit symmetry of bits of the transmission signal by generating an internal transmission signal, in which the dominant phase of the bits is shortened and the recessive phase of the bits is lengthened; and
transmitting, with the transceiver, the internal transmission signal as a message to at least one additional user station of the bus system via the bus system;
wherein at least one of:
the method further comprises obtaining a measurement of an actual bit symmetry, and at least one of (a) determining whether to shorten the dominant phase depending on the measurement and (b) setting a variable amount by which the dominant phase is shortened depending on the measurement;
the method further comprises switching the transmission signal processing on or off as a function of an arbitration phase and a data area of the message; and
the processing of the transmission signal is based on a detection of the data area of the message.

* * * * *